Patented Aug. 14, 1945

2,382,383

UNITED STATES PATENT OFFICE 2,382,383

PURIFICATION OF ACRYLONITRILE

Erwin L. Carpenter, Old Greenwich, Conn., assignor to American Cyanamid Company, New York, N. Y., a corporation of Maine No Drawing. Application June 27, 1942, Serial No. 448,838

4 Claims. (Cl. 260—464)

The present invention relates to the purification of acrylonitrile, and more specifically to a method of removing acetylene polymers from crude acrylonitrile.

Crude acrylonitrile as now produced may contain impurities of the acetylene polymer type, such as for example divinylacetylene and its isomer, ethinyl butadiene, which have boiling points close to that of pure acrylonitrile. Consequently, removal of these impurities by fractional distillation is extremely difficult.

Divinylacetylene has a boiling point of 83.5° C. at 760 mm., a refractive index of 1.5047 and a density of 0.7759 at 20° C. The physical constants of ethinyl butadiene are substantially the same as the above. Acrylonitrile has a boiling point of 77.5° C. at 760 mm., a refractive index of 1.3915 and a density of 0.8062 at 20° C.

The presence of the above impurities in acrylonitrile can be detected by an increase in the refractive index, a lowering of the density, or by rapid bromine absorption in diffused sunlight.

A suitable reagent for detecting divinylacetylene and/or its isomer in acrylonitrile consists of a dilute bromine solution in carbon tetrachloride (4 cc. of bromine in 100 cc. of carbon tetrachloride). Such an impure acrylonitrile rapidly decolorizes the bromine solution, the latter being added drop-wise, whereas the addition of a few drops of the test solution to pure acrylonitrile imparts a yellow brown color which remains for 10 to 15 minutes in diffused sunlight.

While investigating methods of detecting the presence of small quantities of divinylacetylene and/or its isomer in acrylonitrile, a suitable method of removing impurities of the acetylene polymer type from crude acrylonitrile has been discovered. This new method takes advantage of the preferential affinity of chlorine and bromine for acetylene polymers as against acrylonitrile. It consists in treating the crude acrylonitrile with either bromine or chlorine to form high boiling halogen derivatives of the acetylene polymers. Separation of the acrylonitrile from the high boiling materials is then easily accomplished by ordinary distillation.

At certain intervals during the halogenation procedure samples of the treated mixture are withdrawn and tested with the above bromine-carbon tetrachloride solution to determine whether halogenation of the acetylene polymers is complete. In making the test, 2 or 3 drops of the bromine solution are added to about 2 cc. of the sample. If the halogenation of the acetylene polymers is completed the yellow color of the bromine will remain in the sample for at least 10 minutes, otherwise decolorization will take place rapidly. This test is also of particular value in avoiding the addition of more halogen than is required to react with the acetylene polymers.

Bromination or chlorination of the acetylene polymers may be conveniently carried out at temperatures of from 0° C. to 30° C. without substantial loss of acrylonitrile through such halogenation. Although somewhat higher temperatures may be employed there is a greater tendency for the halogen to react with the acrylonitrile.

The invention will be illustrated in greater detail by the following examples.

Example 1

The quantity of bromine was calculated that would be required to brominate the divinylacetylene in a crude dry acrylonitrile (refractive index of 1.3907 at 25° C.) containing approximately 1.8% of the acetylene polymer. 15.4 g. of liquid bromine were then added over a period of 2½ hours to 154 g. of the crude acrylonitrile. The solution was thoroughly stirred and cooled to about 10° C. during the addition of the bromine. Distillation of the product yielded acrylonitrile having a boiling point of 77.5° C. at 760 mm. and a refractive index of 1.3893 at 25° C. A 2 cc. sample of the distilled product was tested with dilute bromine solution (4 cc. of bromine in 100 cc. of carbon tetrachloride). The color imparted by 3 drops of the bromine test solution lasted for more than 10 minutes.

Example 2

Chlorine was passed slowly into 197 g. of crude dry acrylonitrile containing approximately 1.8% of acetylene polymers until a total of 10.8 g. had been added (a calculated excess). The mixture was agitated and held at approximately 5° C. during the chlorination. The resulting solution was yellow in color from an excess of chlorine. The color disappeared in about 5 minutes and the solution was found to be acid which indicated that the excess chlorine had reacted with a small portion of the acrylonitrile. The solution was washed with sodium acid carbonate solution until neutral and then distilled. The acrylonitrile obtained had a boiling point of 77.5° C. at 760 mm. and a refractive index of 1.3896 at 25° C.

A simple and convenient method is available for the removal of acetylene polymers from crude acrylonitrile.

While the invention has been described with particular reference to specific embodiments, it is to be understood that it is not to be limited thereto but is to be construed broadly and restricted solely by the scope of the appended claims.

I claim:

1. The method of removing acetylene polymers from crude acrylonitrile which comprises treating the crude acrylonitrile with a quantity of a halogen selected from the group consisting of bromine and chlorine sufficient to halogenate the acetylene polymers and insufficient to halogenate any substantial quantity of the acrylonitrile, separating and recovering the acrylonitrile therefrom.

2. The method of claim 1 wherein the halogenation of the acetylene polymers is carried out at a temperature within the range of 0° C. to 30° C.

3. The method of removing acetylene polymers from crude acrylonitrile which comprises treating the crude acrylonitrile with a quantity of chlorine sufficient to chlorinate the acetylene polymers and insufficient to chlorinate any substantial quantity of the acrylonitrile at a temperature within the range of 0° C. and 30° C., separating and recovering the acrylonitrile therefrom.

4. The method of removing divinylacetylene from crude acrylonitrile which comprises treating the crude acrylonitrile with a quantity of bromine sufficient to brominate the divinylacetylene and insufficient to brominate any substantial quantity of the acrylonitrile at a temperature within the range of 0° C. and 30° C., separating and recovering the acrylonitrile therefrom.

ERWIN L. CARPENTER.